United States Patent [19]

Mason

[11] 3,893,069

[45] July 1, 1975

[54] VEHICLE ALARM SYSTEM

[75] Inventor: Robert L. Mason, Durham, N.C.

[73] Assignee: The Raymond Lee Organization, Inc., New York, N.Y. ; a part interest

[22] Filed: Mar. 28, 1974

[21] Appl. No.: 455,114

[52] U.S. Cl. ............ 340/63; 340/224; 307/10 AT; 325/117
[51] Int. Cl. ............................................ B60r 25/10
[58] Field of Search.......... 340/52 F, 58, 63, 64, 65, 340/224; 325/111, 117; 307/10 AT

[56] References Cited
UNITED STATES PATENTS

| | | | |
|---|---|---|---|
| 3,703,714 | 11/1972 | Andrews | 325/117 X |
| 3,786,413 | 1/1974 | Ross et al. | 325/117 X |

*Primary Examiner*—Alvin H. Waring
*Attorney, Agent, or Firm*—Daniel Jay Tick

[57] ABSTRACT

A vehicle alarm system energizes a tone generator which produces a signal transmitted by a radio transmitter when any of the passenger compartment doors, trunk cover and engine cover are opened without authorization. The signal is picked up by a radio receiver.

3 Claims, 1 Drawing Figure

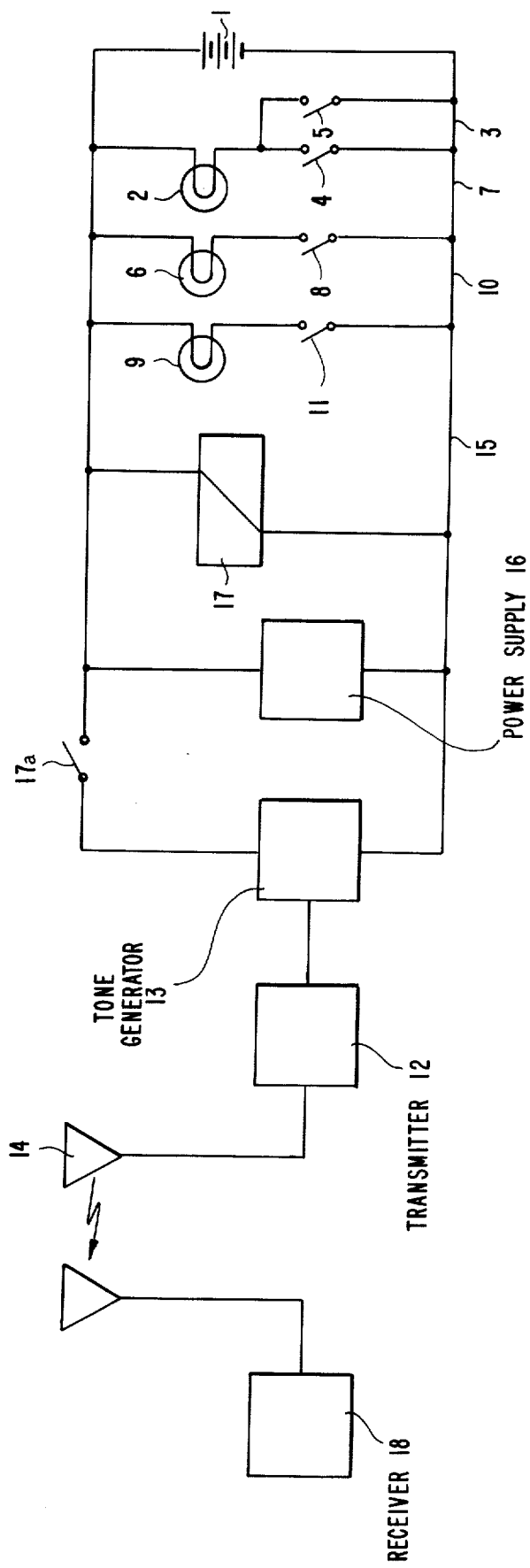

3,893,069

VEHICLE ALARM SYSTEM

DESCRIPTION OF THE INVENTION:

The present invention relates to a vehicle alarm system.

Objects of the invention are to provide a vehicle alarm system of simple structure, which is inexpensive in manufacture, installable in new and existing vehicles with facility and convenience, and functions efficiently, effectively and reliably to warn the owner of a motor vehicle anywhere within a predetermined radius from the vehicle when such vehicle is tampered with by unauthorized persons.

In order that the invention may be readily carried into effect, it will now be described with reference to the accompanying drawing, wherein the single FIGURE is a circuit diagram of an embodiment of the vehicle alarm system of the invention.

The vehicle alarm system of the invention is for a vehicle having a battery 1. The vehicle has a passenger compartment having doors (not shown in the FIGURE), a compartment lamp 2 therein and a compartment circuit 3 including the battery 1 for electrically energizing the compartment lamp. The passenger compartment also has a plurality of compartment switches 4 and 5. Each of the compartment switches 4 and 5 is at a corresponding one of the doors for closing the compartment circuit 3 to energize the compartment lamp 2 when a compartment door is opened.

The vehicle has a trunk having a trunk cover (not shown in the FIGURE). A trunk lamp 6 is provided in the trunk. A trunk circuit 7 including the battery 1 electrically energizes the trunk lamp 6. A trunk switch 8 at the trunk cover closes the trunk circuit 7 to energize the trunk lamp 6 when the trunk cover is opened.

The vehicle has an engine in an engine area (not shown in the FIGURE). The engine area has an engine cover (not shown in the FIGURE). An engine lamp 9 is provided in the engine area. An engine circuit 10 including the battery 1 electrically energizes the engine lamp 9. An engine switch 11 at the engine cover closes the engine circuit 10 to energize the engine lamp 9 when the engine cover is opened.

The vehicle alarm system of the invention comprises a radio transmitter 12 for transmitting signals. The radio transmitter 12 may comprise any suitable transmitter such as, for example, a walkie-talkie. The radio transmitter preferably operates in the citizen's band with a range of approximately one-half mile.

A tone generator 13 of any suitable type such as, for example, an Eico Craft eight key electronic organ unit, is connected to the transmitter 12 for producing signals. The tone generator 13 supplies the signals which it produces to the transmitter 12 for transmission. The transmitter 12 may transmit the signals via an antenna 14 of any suitable type, which may be the antenna of the vehicle or of the walkie-talkie.

An energizing circuit 15 couples the tone generator 13 to the compartment circuit 3, the trunk circuit 7 and the engine circuit 10 for energizing the tone generator to produce signals when any of these circuits is closed.

The energizing circuit 15 comprises a power supply 16 of any suitable type which converts the 12 volt output of the battery 1 to a regulated 9 volts. The power supply 16 is connected to the battery 1 for producing the 9 volt voltage to energize the tone generator 13.

The energizing circuit 15 further comprises a relay switch 17a connected between the power supply 16 and the tone gererator 13 for controlling the energization of the tone generator. A relay winding 17 is connected in parallel with the compartment lamp 2, the trunk lamp 6 and the engine lamp 9 for controlling the operation of the relay switch 17a. The relay winding 17 closes the relay switch 17a to connect the tone generator 13 to the power supply 16 when a lamp 2, 6 or 9 is energized.

A radio receiver 18 of any suitable type, such as, for example, a walkie-talkie, receives the signals transmitted by the transmitter 12. Thus, the owner of the vehicle may be anywhere within the range of the transmitter 12 and is warned when anyone tempers with his vehicle.

While the invention has been described by means of a specific example and in a specific embodiment, I do not wish to be limited thereto, for obvious modifications will occur to those skilled in the art without departing from the spirit and scope of the invention.

I claim:

1. A vehicle alarm system for a vehicle having a battery, a passenger compartment having doors, a compartment lamp therein, a compartment circuit including the battery for electrically energizing the compartment lamp and a plurality of compartment switches, each at a corresponding one of the doors for closing the compartment circuit to energize the compartment lamp when a compartment door is opened, a trunk having a trunk cover, a trunk lamp therein, a trunk circuit including the battery for electrically energizing the trunk lamp, a trunk switch at the trunk cover for closing the trunk circuit to energize the trunk lamp when the trunk cover is opened, and an engine area for an engine, said engine area having an engine cover, an engine lamp therein, an engine circuit including the battery for electrically energizing the engine lamp and an engine switch at the engine cover for closing the engine circuit to energize the engine lamp when the engine cover is opened, said alarm system comprising radio transmitting means for transmitting signals;

tone generating means connected to the transmitting means for producing signals and supplying the signals to the transmitting means for transmission; and energizing means coupling the tone generating means to the compartment, trunk and engine circuits for energizing the tone generating means to produce signals when a circuit is closed, the energizing means comprising power supply means connected to the battery for producing a voltage for energizing the tone generating means, a relay switch connected between the power supply means and the tone generating means for controlling the energization of the tone generating means and a relay winding connected in parallel with the compartment, trunk and engine lamps for controlling the operation of the relay switch for closing the relay switch to connect the tone generating means to the power supply means when a lamp is energized.

2. A vehicle alarm system as claimed in claim 1, further comprising radio receiving means for receiving signals transmitted by the transmitting means.

3. A vehicle alarm system as claimed in claim 2, wherein the radio transmitting and receiving means comprise a walkie-talkie set.

* * * * *